US008024725B2

(12) United States Patent
Kim et al.

(10) Patent No.: US 8,024,725 B2
(45) Date of Patent: Sep. 20, 2011

(54) METHOD OF UPGRADING SOFTWARE THROUGH DOWNLOAD IN T-DMB TERMINAL

(75) Inventors: Hyun-Chul Kim, Suwon-si (KR); Young-Jip Kim, Suwon-si (KR); Byoung-Dai Lee, Seongnam-si (KR); Chang-Sup Shim, Seoul (KR); Yun-Je Oh, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1251 days.

(21) Appl. No.: 11/506,136

(22) Filed: Aug. 17, 2006

(65) Prior Publication Data

US 2007/0044087 A1 Feb. 22, 2007

(30) Foreign Application Priority Data

Aug. 17, 2005 (KR) ........................ 10-2005-0075299

(51) Int. Cl.
*G06F 9/44* (2006.01)
*G06F 9/445* (2006.01)

(52) U.S. Cl. .......................... 717/173; 717/120; 717/177

(58) Field of Classification Search ........................ None
See application file for complete search history.

(56) References Cited

U.S. PATENT DOCUMENTS

| | | | | |
|---|---|---|---|---|
| 7,584,470 | B2 * | 9/2009 | Barker et al. | 717/177 |
| 7,673,297 | B1 * | 3/2010 | Arsenault et al. | 717/168 |
| 7,716,660 | B2 * | 5/2010 | Mackay | 717/173 |
| 7,784,028 | B2 * | 8/2010 | Luo et al. | 717/120 |
| 7,823,147 | B2 * | 10/2010 | Moshir et al. | 717/173 |
| 2004/0003266 | A1 * | 1/2004 | Moshir et al. | 713/191 |
| 2005/0055714 | A1 * | 3/2005 | Lee | 725/54 |
| 2005/0240921 | A1 * | 10/2005 | Barker et al. | 717/175 |
| 2006/0130053 | A1 * | 6/2006 | Buljore et al. | 717/173 |

FOREIGN PATENT DOCUMENTS

| | | |
|---|---|---|
| JP | 2005-142751 | 6/2005 |
| JP | 2007-515101 | 6/2007 |
| KR | 2002-76599 | 10/2002 |
| KR | 2003-61601 | 7/2003 |
| KR | 2005-28117 | 3/2005 |
| KR | 2005-42733 | 5/2005 |
| WO | WO 2005-048604 | 5/2005 |

OTHER PUBLICATIONS

"Dynamic software updating", Hicks et al., Nov. 2005, pp. 1049-1096, <http://delivery.acm.org/10.1145/1110000/1108971/p1 049-hicks.pdf>.*

"Mutatis mutandis: safe and predictable dynamic software updating", Stoyle et al., Jan. 2005, pp. 183-194, <http://delivery.acm.org/10.1145/1050000/1040321/p183-stoyle.pdf>.*

ETSI Standards; "Radio Broadcasting Systems; Digital Audio Broadcasting (DAB) To Mobile, Portable and Fixed Receivers; ETSI EN 300 401;" ETSI Standards; vol. BC, No. V1.3.3; May 1, 2001; XP014001360.

* cited by examiner

*Primary Examiner* — Thuy Dao
(74) *Attorney, Agent, or Firm* — Cha & Reiter, LLC

(57) ABSTRACT

A method of upgrading software through a software download in a Terrestrial Digital Multimedia Broadcasting (T-DMB) terminal includes the steps of announcing when the software is downloaded by receiving a T-DMB signal and analyzing a plurality of fast information groups (FIGs), determining whether the software is downloaded, storing ensemble information and download start time information; matching a current ensemble with the stored ensemble when time according to the download start time information elapses, and confirming a signaling message for informing that the software is downloaded and downloading the software.

27 Claims, 8 Drawing Sheets

METHOD OF UPGRADING SOFTWARE THROUGH DOWNLOAD IN T-DMB TERMINAL

CLAIM OF PRIORITY

This application claims the benefit of the earlier filing date, pursuant to 35 U.S.C. §119, to that patent application entitled "Method of Upgrading Software through Download in T-DMB Terminal" filed in the Korean Intellectual Property Office on Aug. 17, 2005 and assigned Serial No. 2005-75299, the contents of which are incorporated herein by reference.

BACKGROUND OF THE INVENTION

1. Field of the Invention

The present invention relates generally to terrestrial digital multimedia broadcasting (T-DMB), and in particular, to a method of upgrading software of a T-DMB terminal by providing announcement and signaling operations to the T-DMB terminal.

2. Description of the Related Art

Digital multimedia broadcasting (DMB) is the world's first system standard established in the Republic of Korea to provide a multimedia broadcasting service including video based on a European digital audio broadcasting (DAB: Eureka-147) system, which is a digital radio broadcasting standard of Europe. This system simultaneously provides a CD-level high-quality audio service and a data service.

FIG. 1 is a block diagram of a conventional terrestrial digital multimedia broadcasting (T-DMB) system.

The T-DMB system illustrated in FIG. 1 includes a DMB broadcasting center 11 generating a DMB signal including DMB contents, a DMB transmission center 12 receiving the DMB signal from the DMB broadcasting center 11 and transmitting the received DMB signal, and a DMB mobile terminal 13 receiving the transmitted DMB signal and displaying a DMB program corresponding to the received DMB signal to a user.

In the T-DMB system, a DMB signal is allocated to each of a plurality of broadcasting stations using a frequency band, i.e., ensemble.

FIG. 2 is a block diagram of a conventional T-DMB mobile terminal.

As illustrated in FIG. 2, the conventional T-DMB mobile terminal 13 includes a radio frequency (RF) tuner 21 for receiving DMB signals input through an antenna and tuning information on an ensemble desired by a user, a demodulator 22 for downconvertering and demodulating a DMB signal corresponding to the ensemble, which is received through the RF tuner 21, to a baseband signal, a channel (service component) demultiplexer 23 for demultiplexing the demodulated DMB signal, and a decoder 24 for decoding a predetermined channel broadcasting signal selected by the channel (service component) demultiplexer 23.

In the conventional T-DMB system, software for the conventional T-DMB mobile terminal is continuously upgraded. However, to upgrade the software, an operation for reserving the software upgrade or announcing the beginning of the software upgrade is required. And as such, the conventional T-DMB system does not provide an algorithm for upgrading software of the conventional T-DMB mobile terminal.

SUMMARY OF THE INVENTION

An object of the present invention is to substantially solve at least the above problems and/or disadvantages. Accordingly, an object of the present invention is to provide a method of upgrading software in a terrestrial digital multimedia broadcasting (T-DMB) terminal by receiving information on a first download for the software upgrade through a fast information channel (FIC) using a T-DMB receiver and downloading desired software using the information received from the first download.

The above object is achieved using announcement and signaling through the FIC.

According to one aspect of the present invention, there is provided a method of upgrading software in a T-DMB terminal, the method comprising the steps of confirming, by the T-DMB terminal, an announcement message containing information for announcing when the software is downloaded by receiving a T-DMB signal and analyzing a plurality of fast information groups (FIGs), determining whether the software is downloaded according to information contained in the announcement message, if it is determined that the software is downloaded, storing ensemble information and download start time information among the information contained in the announcement message, matching a current ensemble with the stored ensemble when time according to the download start time information elapses, and confirming a signaling message for informing that the software is downloaded by analyzing an FIG received through the matched ensemble, and downloading the software.

BRIEF DESCRIPTION OF THE DRAWINGS

The above features and advantages of the present invention will become more apparent from the following detailed description when taken in conjunction with the accompanying drawing in which.

DETAILED DESCRIPTION OF THE INVENTION

Now, embodiments of the present invention will be described herein below with reference to the accompanying drawings. For the purposes of clarity and simplicity, well-known functions or constructions are not described in detail as they would obscure the invention in unnecessary detail.

A T-DMB system is designed to provide a video service, an audio service, and a data service. In the T-DMB system, data is transmitted by broadcasting stations using separate ensembles in which a plurality of services, such as the video service, the audio service, and the data service, exist. Each of the video service, the audio service, and the data service can include one or more service components.

In the T-DMB system, information is transmitted using a transmission frame.

Figure 5:
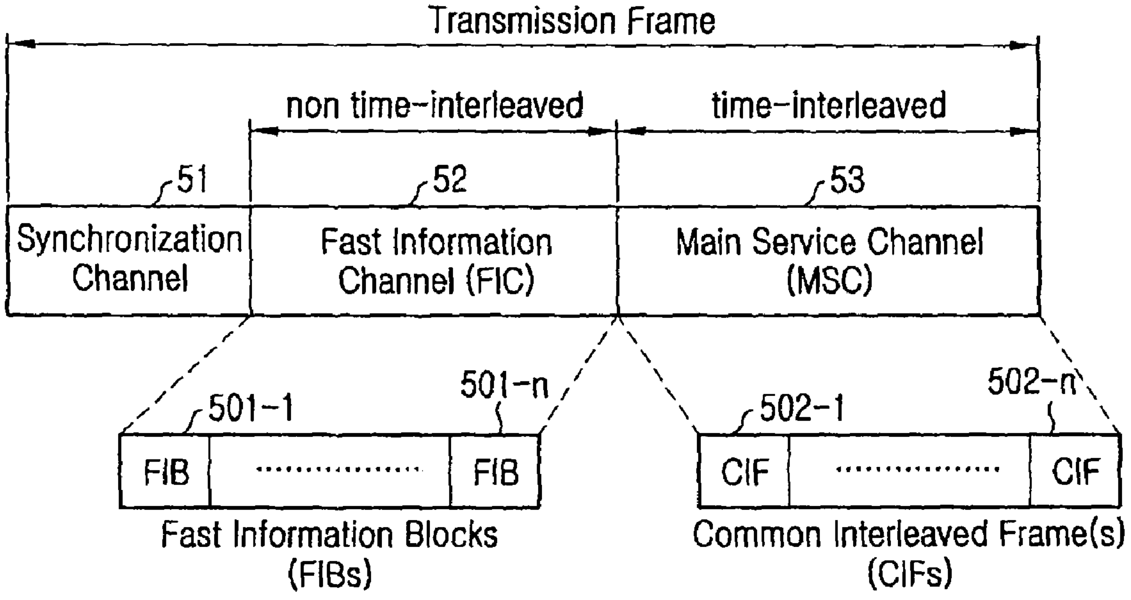
FIG. 5 illustrates a DMB transmission frame configuration according to a preferred embodiment of the present invention.

FIG. 5 represents a DMB transmission frame according to a preferred embodiment of the present invention.

Referring to FIG. 5, the DMB transmission frame includes a synchronization channel 51 for transmitting internal information regarding a DMB transmission system, an FIC 52, which is assigned to transmit information to which a DMB terminal has the necessity of a quick access, and a main service channel (MSC) 53 for transmitting a main service such as video, audio or data service components.

The synchronization channel 51 is used to transmit internal information regarding a DMB transmission system and includes information associated with transmission frame synchronization, automatic frequency control, channel state estimation information, and transmitter identification.

The FIC 52 is composed of a plurality of fast information blocks (FIBs) 501-1 to **501-*n***. The FIB include multiplex configuration information (MCI), which is information associated with an ensemble configuration, service information related to services of an ensemble, and data for which quick transmission is required.

The MSC 53 is used to transmit service components such as a video component, an audio component, and/or a data component. The MSC 53 is divided into a plurality of convolutionally coded sub-channels. Each of the sub-channels is composed of a plurality of common interleaved frames (CIFs) 502-1 to **502-*n***.

The configuration and the length of the transmission frame depends on a transmission mode. A T-DMB system according to a preferred embodiment of the present invention introduces the FIBs 501-1 to **501-*n* and the CIFs 502-1 to 502-*n* to provide transmission modes regardless of the types of data to be transmitted using the FIC 52 and the MSC 53. That is, data is transmitted in a unit of the FIBs 501-1 to 501-*n* or the CIFs 502-1 to 502-*n* regardless of transmission modes. However, only the number of the FIBS 501-1 to 501-*n* and the CIFs 502-1 to 502-*n* is specified according to transmission modes. The number of the FIBs 501-1 to 501-*n* and the CIFs 502-1 to 502-*n*** according to transmission modes is illustrated in Table 1.

TABLE 1

| Transmission mode | Length of transmission frame | Number of FIBs per transmission frame | Number of CIFs per transmission frame |
|---|---|---|---|
| I | 96 ms | 12 | 4 |
| II | 24 ms | 3 | 1 |
| III | 24 ms | 4 | 1 |
| IV | 48 ms | 6 | 2 |

A configuration of each of the FIBs 501-1 to **501-*n* will now be described in detail with reference to FIG. 6**.

Figure 6:
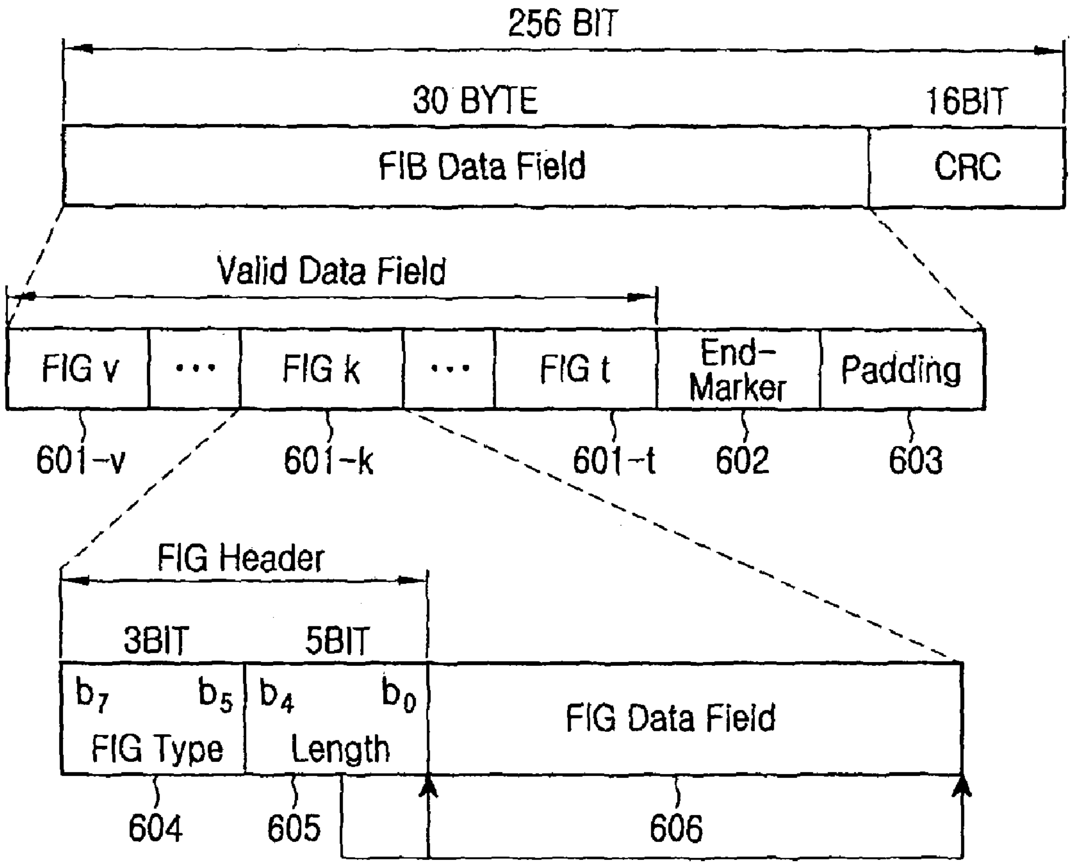
FIG. 6 illustrates a fast information block (FIB) configuration of a DMB transmission frame according to a preferred embodiment of the present invention.

Referring to FIG. 6, each of the FIBs 501-1 to **501-*n* includes a 30-byte FIB data field including a plurality of Fast Information Groups (FIGS. 601-*v* to 601-*t***, each being an information carrying unit, and a 16-bit cyclic redundancy check (CRC) field assigned to check errors.

The FIB data field includes the plurality of FIGS. **601-*v* to 601-*t*, each being an information carrying unit, an end-marker field 602 for indicating that all FIGs are carried, and a padding field 603** used to match the transmission length.

In particular, each of the plurality of FIGS. **601-*v* to 601-*t* includes an FIG header including an FIG type field 604 for indicating a characteristic of information to be transmitted and a length field 605 for indicating the length of the information to be transmitted, and an FIG data field 606** for carrying the information to be transmitted.

In the embodiments of the present invention, the FIGS. **601-*v* to 601-*t*** are classified into 8 types according to information to be transmitted. Table 2 illustrates these 7 FIG types.

TABLE 2

| FIG type no. | FIG type | FIG application |
|---|---|---|
| 0 | 000 | Part of MCI and service information |
| 1 | 001 | Label, etc. (part of service information) |
| 2 | 010 | Reserved |
| 3 | 011 | Reserved |
| 4 | 100 | Reserved |
| 5 | 101 | FIC data channel (FIDC) |
| 6 | 110 | Conditional access |
| 7 | 111 | In-house (excluding length 31) |

When a software upgrade operation according to a preferred embodiment of the present invention is performed using the information regarding the transmission frame, announcement and signaling are performed using the FIBs 501-1 to **501-*n*, and the software to be upgraded is transmitted using the MSC 53**.

Figure 1:
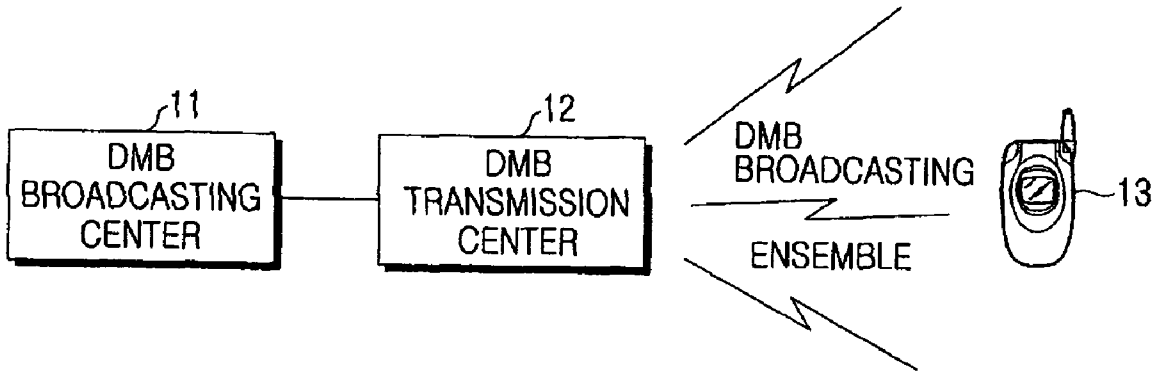
FIG. 1 is a block diagram of a conventional T-DMB system.
Figure 2:
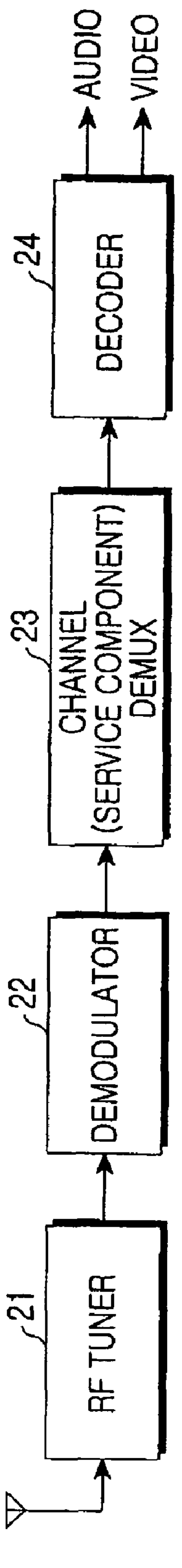
FIG. 2 is a block diagram of a conventional T-DMB mobile terminal.
Figure 3:
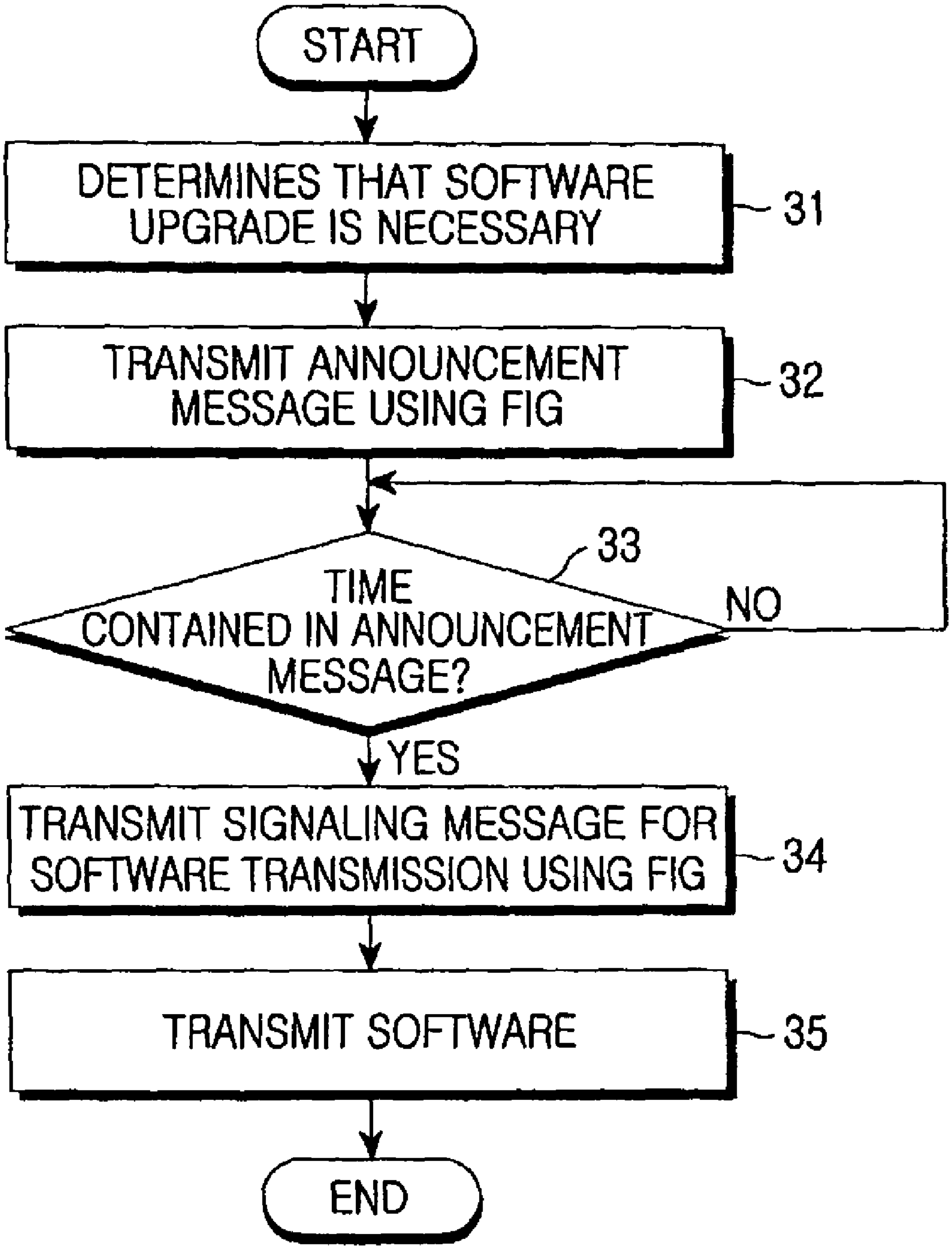
FIG. 3 is a flowchart illustrating a method of transmitting software for a software upgrade in a T-DMB system according to a preferred embodiment of the present invention.

FIG. 3 is a flowchart illustrating a method of transmitting software for a software upgrade in a T-DMB system according to a preferred embodiment of the present invention.

Referring to FIG. 3, in step 31, the T-DMB system determines whether an upgrade of software of a T-DMB terminal is necessary. In this case, the software may include firmware, operating system software, device driver software, native application software, and/or middleware of the T-DMB terminal.

Figure 7:
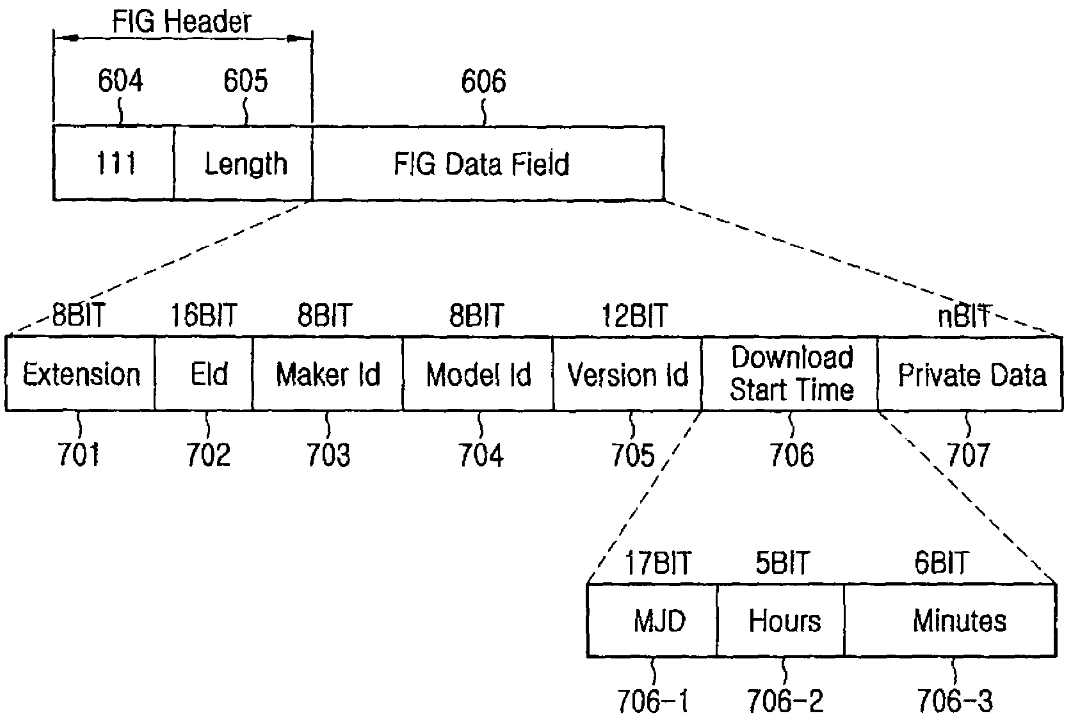
FIG. 7 illustrates a fast information group (FIG) for announcement according to a preferred embodiment of the present invention.

If it is determined that the software upgrade is necessary, an announcement message is transmitted to the T-DMB terminal in step 32 using an FIG as shown in FIG. 7. The announcement message contains information on that software to be upgraded (version information, etc.), a maker ID and a model name of the T-DMB terminal for which the software upgrade is required, information on an ensemble by which the software is carried, and time information of the software to be transmitted.

In step 33, it is determined whether a time corresponding to the time information contained in the announcement message elapses. If it is determined that the time corresponding to the time information has elapsed, a signaling message is transmitted to the T-DMB terminal to inform the terminal that the software is transmitted using an ensemble corresponding to the ensemble information contained in the announcement message in step 34. Like the announcement transmission, signaling is achieved using an FIG as shown in FIG. 6. Similar to the announcement message, the signaling message contains information on the software to be upgraded (version information, etc.), a maker ID and a model name of the T-DMB terminal for which the software upgrade is required, and time information of the software to be transmitted.

In step 35, the software is transmitted to the T-DMB terminal.

Configurations of transmission frames for announcement and signaling will now be described in more detail.

FIG. 7 is a configuration of an FIG for an announcement according to a preferred embodiment of the present invention.

Referring to FIG. 7, in the fast information group (FIG) for announcement, the FIG type field 604 is specified to a value of "7", which according to the T-DMB standard illustrated in Table 2, the value or type "7" of the FIG transmitted using an FIC of a DMB transmission frame refers to "in-house."

Thus, announcement and signaling for a software upgrade according to a preferred embodiment of the present invention are performed using the value or type "7".

In FIG. 7, in a software download process, an announcement represents information for informing a T-DMB terminal when software is downloaded, and as illustrated in FIG. 7, the 3-bit FIG type field 604 is specified to the value or type "7", and the 5-bit length field 605 contains length information of data contained in the FIG data field 606. The FIG data field 606 includes an extension field 701 for specifying information contained in the FIG, an ensemble ID (EID) field 702 for indicating information on an ensemble through which the software is downloaded, a maker ID field 703 for indicating a maker of the T-DMB terminal for which the software upgrade is required, a model ID field 704 for identifying a model of the T-DMB terminal for which the software upgrade is required, a version ID field 705 for indicating version information of the software to be downloaded, a download start time field 706 for indicating when the software begins to be downloaded, and a private data field 707 set to contain additional information for the maker or the model.

In particular, the download start time field 706 includes a modified Julian date (MJD) field 706-1 for indicating date information, an hour field 706-2 for indicating hour information, and a minute field 706-3 for indicating minute information. An MJD value is a 17-bit binary value coded in a modified Julian coding scheme, indicating date information.

Values of the extension field 701 are illustrated in Table 3.

TABLE 3

| Extension field | FIG type "7" data |
|---|---|
| 00000000 | Software download announcement |
| 00000001 | Software download signaling |
| 00000010~11111111 | Reserved |

Referring to Table 3, if a FIG is used for software download announcement as illustrated in FIG. 7, the extension field 701 must be set to '00000000'.

Figure 8:
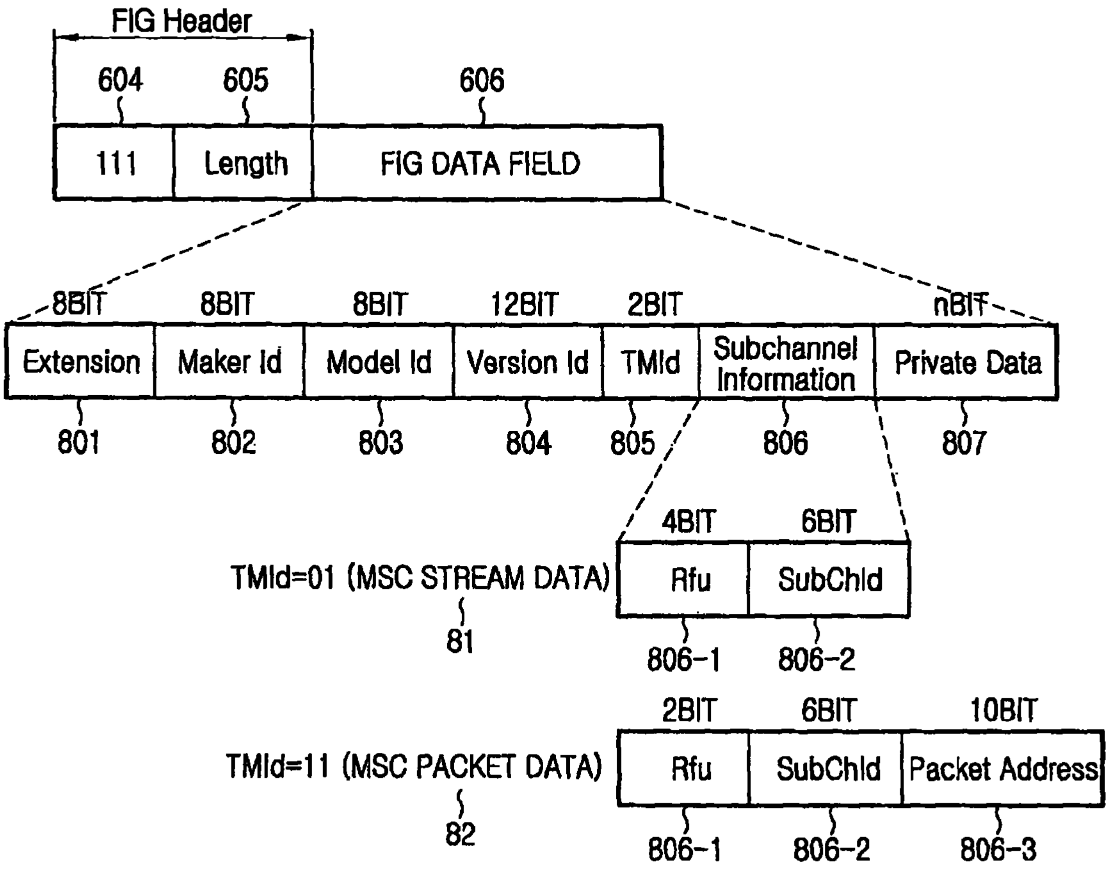
FIG. 8 illustrates a fast information group (FIG) or signaling according to a preferred embodiment of the present invention.

FIG. 8 is a configuration of an FIG for signaling according to a preferred embodiment of the present invention.

Referring to FIG. 8, in the FIG for signaling in the current embodiment, the FIG type field 604 is specified to a value or type "7". According to the T-DMB standard illustrated in Table 2, the type "7" of the FIG transmitted using an FIC of a DMB transmission frame refers to "in-house".

Thus, both announcement and signaling for a software upgrade according to a preferred embodiment of the present invention are performed using the type code "7". However, it would be recognized that the type code shown herein is only to illustrate the principles of the invention and may be of a different value and may also be different between the announcement and the signaling messages.

In FIG. 8, in a software download process, signaling is information for informing a T-DMB terminal that software begins to be downloaded, and as illustrated in FIG. 8, the 3-bit FIG type field 604 is specified to "7", and the 5-bit length field 605 contains length information of data contained in the FIG data field 606.

The FIG data field 606 includes an extension field 801 for specifying information contained in the FIG, a maker ID field 802 for indicating a maker of the T-DMB terminal for which the software upgrade is required, a model ID field 803 for identifying a model of the T-DMB terminal for which the software upgrade is required, a version ID field 804 for indicating version information of the software to be downloaded, a transmission mode ID (TMId) field 805 for indicating a transmission mode of data for the software upgrade, a sub-channel field 806 for specifying a sub-channel according to the TMId field 805, and a private data field 807 set to contain additional information for the maker or the model.

Referring to Table 3, if an FIG is used for software download signaling as illustrated in FIG. 8, the extension field 801 must be set to '00000001'.

Actual data for the software upgrade is transmitted using an MSC. When the MSC is transmitted, an MSC stream mode 81 or an MSC packet mode 82 can be used as a transmission mode of the MSC. Thus, the TMId field 805 for indicating a transmission mode of data for the software upgrade is largely classified into two modes, i.e., the MSC stream mode 81 and the MSC packet mode 82.

According to the TMId field 805, a configuration of the sub-channel field 806 is changed. That is, when the TMId field 805 indicates stream data, the sub-channel field 806 includes an Rfu field 806-1 and a sub-channel ID (SubChld) field 806-2, and when the TMId field 805 indicates packet data, the sub-channel field 806 includes the Rfu field 806-1, the SubChld field 806-2, and a packet address field 806-3.

Figure 4:
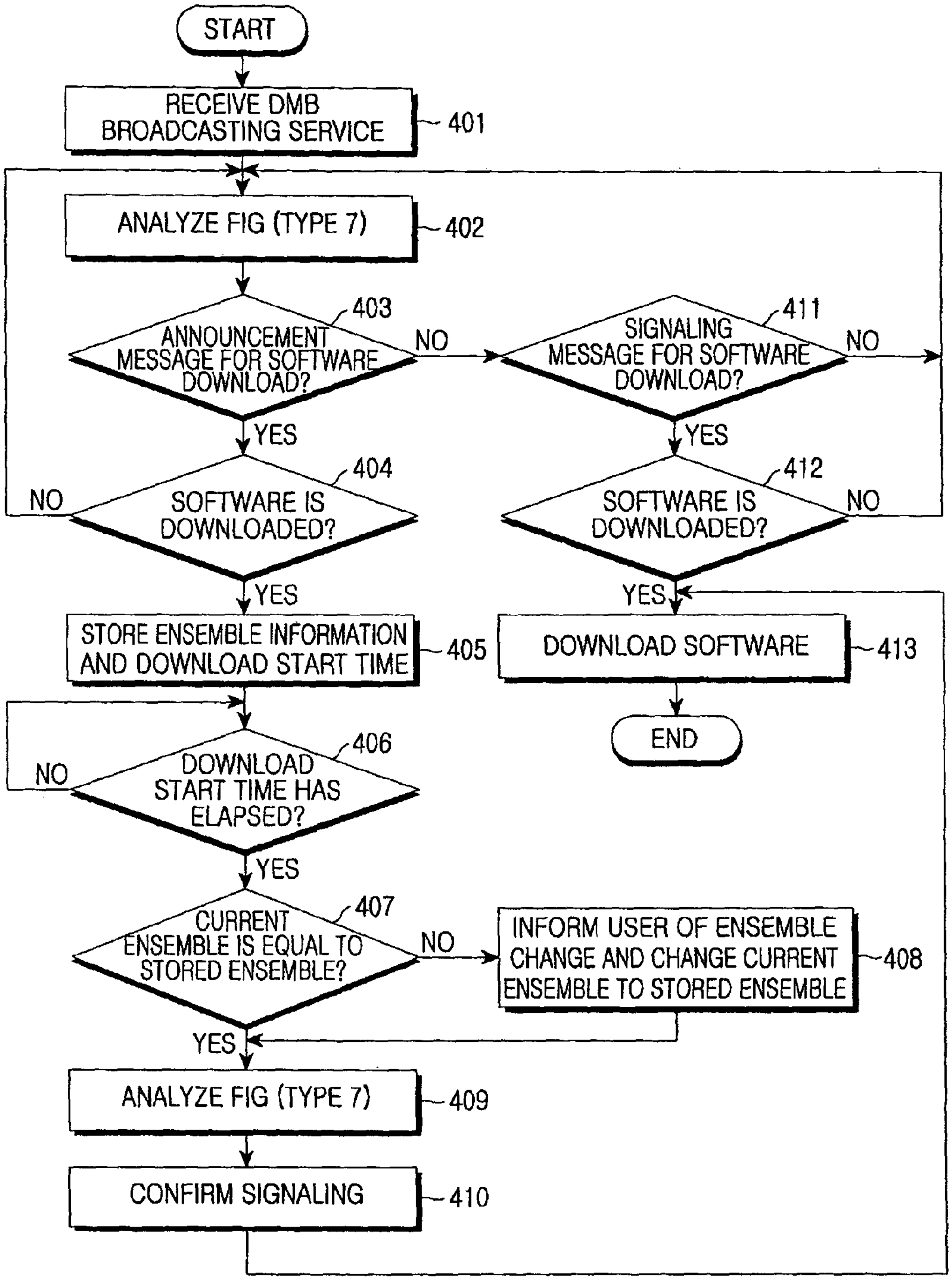
FIG. 4 is a flowchart illustrating a method of upgrading software in a T-DMB terminal according to a preferred embodiment of the present invention.

FIG. 4 is a flowchart illustrating a method of upgrading software in a T-DMB terminal according to a preferred embodiment of the present invention.

Referring to FIG. 4, in step 401, the T-DMB terminal receives a DMB broadcasting service. In step 402, the T-DMB terminal analyzes an FIG contained in the received DMB broadcasting service. The FIG analysis is achieved using an FIG type field and an extension field of the received FIG as illustrated in FIG. 7 or 8. In step 403, the T-DMB terminal determines whether the received FIG contains announcement information for a software download.

If it is determined that the FIG contains the announcement information for a software download, in step 404, the T-DMB terminal determines whether to download software. For the determination, analysis of a maker ID field, a model ID field, and a version ID field contained in the FIG is made. Thus, the T-DMB terminal downloads the software based on whether a model of the T-DMB terminal matches the model of the maker to be upgraded through the software download and whether the version to be upgraded through the software download is the latest version.

If it is determined, at step 404, that the T-DMB terminal is to download the software, the T-DMB terminal stores download start time information and ensemble information in step 405. If it is the stored download start time in step 406, the T-DMB terminal determines in step 407 whether current ensemble information is equal to the stored ensemble information. If it is determined that the current ensemble information is not equal to the stored ensemble information, the T-DMB terminal informs a user of an ensemble change and changes the current ensemble information to the stored ensemble information in step 408. In this case, the user can set whether the ensemble change is performed after or without user's approval.

The T-DMB terminal performs the software upgrade by analyzing another or second FIG in step 409, and after confirming signaling in step 410, downloading the software in step 413.

Returning to step 403, when the T-DMB terminal directly receives an FIG containing signaling information for a software download without receiving the announcement information in step 411, the T-DMB terminal determines in step 412 whether software is downloaded according to a maker ID field, a model ID field, and a version ID field contained in the FIG for signaling and downloads the software in step 413.

The method of the present invention can be written as computer programs and can be implemented in general-use digital computers that execute the programs using a computer readable recording medium or memory (CD-ROM, RAM, a floppy disk, a hard disk, an optical magnetic disc, etc.). It would be recognized that the terminal may include a processor that receives and executes the computer program (i.e., computer-executable code) stored in a memory.

As described above, according to the embodiments of the present invention, by a T-DMB system transmitting information for a software upgrade using an FIC and performing a software download using an MSC, a T-DMB terminal can effectively perform a remote software download.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method, executable by a central processing unit (CPU), of upgrading software through a software download in a terrestrial digital multimedia broadcasting (T-DMB) terminal, the method comprising the steps of:

confirming an announcement message received by the terminal from a T-DMB station containing information for announcing when the software is downloaded by analyzing information in a plurality of fast information groups (FIGs) contained in a T-DMB signal;

determining whether the software is downloaded according to information contained in the announcement message;

if it is determined that the software is downloaded, storing ensemble information and download start time information among the information contained in the announcement message;

matching a current ensemble with the stored ensemble when time according to the download start time information elapses; and confirming a signaling message for informing that the software is downloaded by analyzing information in a FIG received through the matched ensemble, and downloading the software, wherein the announcement message and the signaling message are transmitted using a fast information channel (FIC), and the software is downloaded in a main service channel (MSC) of said FIC.

2. The method of claim 1, further comprising the steps of:

if a signaling message is received without confirming the announcement message, determining whether the software is downloaded according to information contained in the signaling message; and if it is determined that the software is downloaded, downloading the software.

3. The method of claim 2, wherein FIG information associated with a signaling message is of a type 7.

4. The method of claim 3, wherein the signaling message contains:

an extension field for specifying information contained in the FIG;

a maker ID field for indicating a maker of the T-DMB terminal for which the software upgrade is required;

a model ID field for identifying a model of the T-DMB terminal for which the software upgrade is required;

a version ID field for indicating version information of the software to be downloaded;

a transmission mode ID (TMId) field for indicating a transmission mode of data for the software upgrade;

a sub-channel field for specifying a sub-channel according to the TMId field; and a private data field containing additional information for the maker or the model.

5. The method of claim 4, wherein the step of determining whether the software is downloaded according to information contained in the signaling message comprises the step of:

determining whether the software is downloaded by comparing the information on the maker ID field, the model ID field, and the version ID field to information on the T-DMB terminal.

6. The method of claim 2, wherein FIG information associated with the signaling message is of a value selected from the group consisting of all integer values limited by the number of bits associated with the type value field.

7. The method of claim 1, wherein the FIG information associated with an announcement message is of a type 7.

8. The method of claim 7, wherein the announcement message contains:

an extension field for specifying information contained in the FIG;

an ensemble ID (EID) field for indicating information on an ensemble through which the software is downloaded;

a maker ID field for indicating a maker of the T-DMB terminal for which the software upgrade is required;

a model ID field for identifying a model of the T-DMB terminal for which the software upgrade is required;

a version ID field for indicating version information of the software to be downloaded;

a download start time field for indicating when the software begins to be downloaded; and a private data field contains additional information for the maker or the model.

9. The method of claim 8, wherein the step of determining whether the software is downloaded according to information contained in the announcement message comprises the step of:

determining whether the software is downloaded by comparing the information on the maker ID field, the model ID field, and the version ID field to information on the T-DMB terminal.

10. The method of claim 1, wherein FIG information associated with the signaling message is of a type 7.

11. The method of claim 10, wherein the signaling message contains:

an extension field for specifying information contained in the FIG;

a maker ID field for indicating a maker of the T-DMB terminal for which the software upgrade is required;

a model ID field for identifying a model of the T-DMB terminal for which the software upgrade is required;

a version ID field for indicating version information of the software to be downloaded;

a transmission mode ID (TMId) field for indicating a transmission mode of data for the software upgrade;

a sub-channel field for specifying a sub-channel according to the TMId field; and a private data field containing additional information for the maker or the model.

12. The method of claim 11, wherein the TMId field is determined as one of a main service channel (MSC) stream mode or an MSC packet mode.

13. The method of claim 1, wherein FIG information associated with the signaling message is of a value selected from the group consisting of all integer values limited by the number of bits associated with the type value field.

14. The method of claim 1, wherein FIG information associated with the announcement message is of a value selected from the group consisting of all integer values limited by the number of bits associated with the type value field.

15. A terrestrial digital multimedia broadcasting (T-DMB) terminal, comprising:

a memory containing computer-executable code; and a processor in communication with the memory, the computer-executable code providing instruction to the processor for executing the steps of:

confirming an announcement message by the terminal from a T-DMB station containing information for announcing when the software is downloaded by analyzing a plurality of fast information groups (FIGs) contained in a T-DMB signal;

determining whether the software is downloaded according to information contained in the announcement message;

if it is determined that the software is downloaded, storing ensemble information and download start time information among the information contained in the announcement message;

matching a current ensemble with the stored ensemble when time according to the download start time information elapses; and confirming a signaling message for informing that the software is downloaded by analyzing information in a FIG received through the matched ensemble, and downloading the software, wherein the announcement message and the signaling message are transmitted using a fast information channel (FIC), and the software is downloaded in a main service channel (MSC) of said FIC.

16. The T-DMB terminal of claim 15, the computer-executable code providing the processor further for executing the steps of:

if a signaling message is received without confirming the announcement message, determining whether the software is downloaded according to information contained in the signaling message; and if it is determined that the software is downloaded, downloading the software.

17. The T-DMB terminal of claim 16, wherein FIG information associated with the signaling message is of a type 7.

18. The T-DMB terminal of claim 17, wherein the signaling message contains:

an extension field for specifying information contained in the FIG;

a maker ID field for indicating a maker of the T-DMB terminal for which the software upgrade is required;

a model ID field for identifying a model of the T-DMB terminal for which the software upgrade is required;

a version ID field for indicating version information of the software to be downloaded;

a transmission mode ID (TMId) field for indicating a transmission mode of data for the software upgrade;

a sub-channel field for specifying a sub-channel according to the TMId field; and a private data field contains additional information for the maker or the model.

19. The T-DMB terminal of claim 18, wherein the TMId field is determined as one of a main service channel (MSC) stream mode or an MSC packet mode.

20. The T-DMB terminal of claim 19, wherein the step of determining whether the software is downloaded according to information contained in the signaling message comprises the step of determining whether the software is downloaded by comparing the information on the maker ID field, the model ID field, and the version ID field to information on the T-DMB terminal.

21. The T-DMB terminal of claim 16, wherein FIG information associated with the signaling message is of a value selected from the group consisting of all integer values limited by the number of bits associated with the type value field.

22. The T-DMB terminal of claim 15, wherein the FIG information associated with an announcement message is of a type 7.

23. The T-DMB terminal of claim 22, wherein the announcement message contains:

an extension field for specifying information contained in the FIG;

an ensemble ID (EID) field for indicating information on an ensemble through which the software is downloaded;

a maker ID field for indicating a maker of the T-DMB terminal for which the software upgrade is required;

a model ID field for identifying a model of the T-DMB terminal for which the software upgrade is required;

a version ID field for indicating version information of the software to be downloaded;

a download start time field for indicating when the software begins to be downloaded; and a private data field contains additional information for the maker or the model.

24. The T-DMB terminal of claim 15, wherein the step of determining whether the software is downloaded according to information contained in the announcement message comprises the step of:

determining whether the software is downloaded by comparing the information on the maker ID field, the model ID field, and the version ID field to information on the T-DMB terminal.

25. The T-DMB terminal of claim 15, wherein FIG information associated with the signaling message is of a type 7.

26. The T-DMB terminal of claim 25, wherein the signaling message contains:

an extension field for specifying information contained in the FIG;

a maker ID field for indicating a maker of the T-DMB terminal for which the software upgrade is required;

a model ID field for identifying a model of the T-DMB terminal for which the software upgrade is required;

a version ID field for indicating version information of the software to be downloaded;

a transmission mode ID (TMId) field for indicating a transmission mode of data for the software upgrade;

a sub-channel field for specifying a sub-channel according to the TMId field; and a private data field contains additional information for the maker or the model.

27. The T-DMB terminal of claim 15, wherein FIG information associated with the signaling message is of a value selected from the group consisting of all integer values limited by the number of bits associated with the type value field.

* * * * *